April 25, 1961 F. J. NAGEL 2,981,631
FLUIDIZED BED COATING METHOD FOR FORMING A FOAM
Filed Nov. 13, 1957
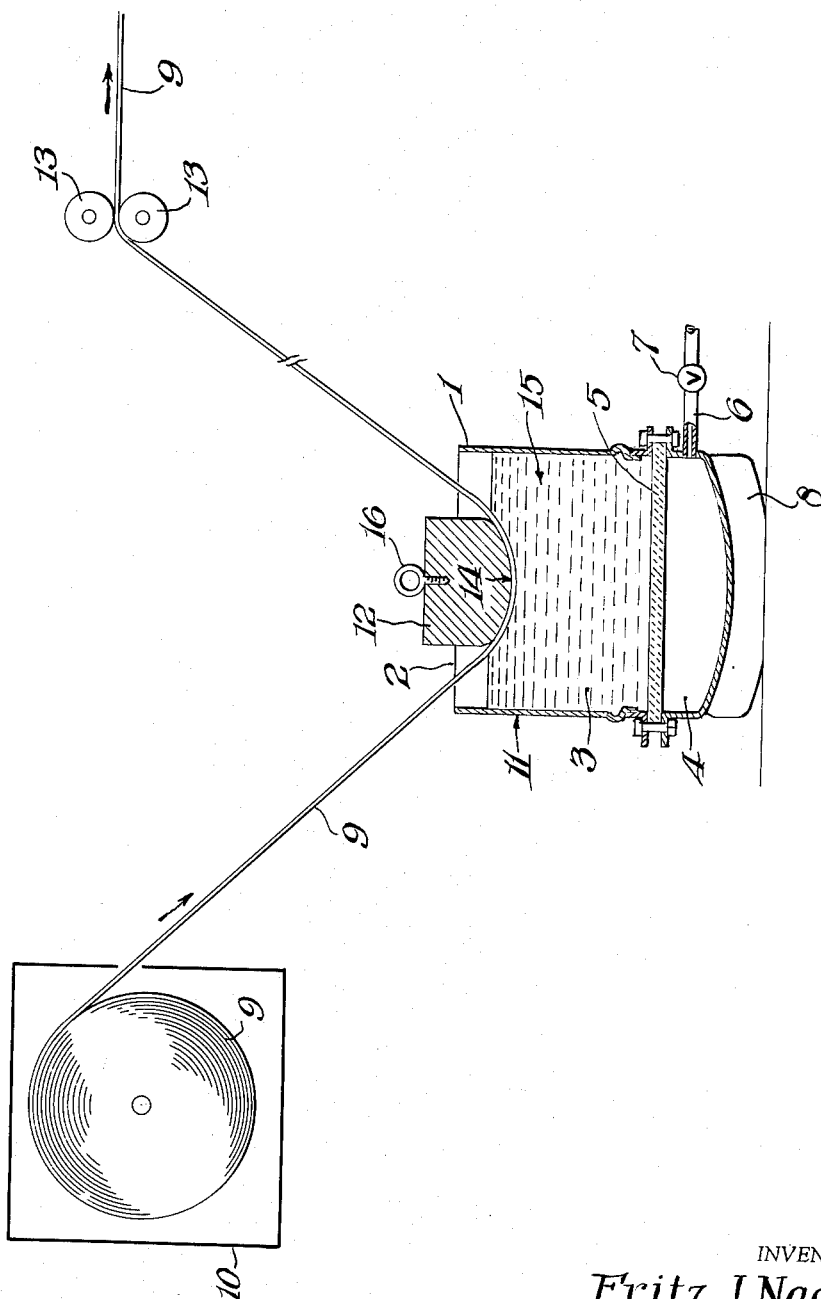
INVENTOR
Fritz J. Nagel
BY
ATTORNEY United States Patent Office 2,981,631
Patented Apr. 25, 1961

2,981,631
FLUIDIZED BED COATING METHOD FOR FORMING A FOAM

Fritz J. Nagel, Reading, Pa., assignor to The Polymer Corporation, a corporation of Pennsylvania Filed Nov. 13, 1957, Ser. No. 696,154

14 Claims. (Cl. 117—21)

This invention relates to making foams through the use of fluidized beds. More particularly, it relates to methods and materials for forming a foam structure on a substrate from polymeric or other materials in pulverulent form.

It is known to prepare foams by incorporating into the material to be foamed a blowing agent and shaping the material under conditions activating the blowing agent. Such agents are, in general, materials which will liberate a gas when heated. Thus, in the shaping, the gas evolved upon activation of the agent causes the material to set with bubbles or voids throughout the mass. The resultant foams are useful in a variety of ways. Hitherto, foaming processes and equipment therefor have been expensive, and the foamed product is frequently prepared at a distance, necessitating the shipment of considerable bulk resulting from the foaming. Usually, the reactants are mixed together just before use and a resultant liquid mixture is poured into a cavity or onto a flat surface and foaming starts. It is frequently desired to have the reactants mixed and unreactive for a period of time, but such high stability is difficult to obtain, particularly with reactive foam modifications such as those used in the urethane field.

Further, hithertofore, the production of relatively thin continuous foamed coatings has not been readily achieved. Also, the production of foams on irregularly-shaped articles could not previously be done in a simple fashion. Better methods and new products are desired.

An object of this invention is to provide materials and processes for preparing foams simply. Another object is the preparation of foams from materials which are highly stable and which foam only at the place where foaming is desired. Another objective is the provision of methods for foaming materials around articles of various shapes without sagging, rundown or dripping. Still another objective is the production of relatively thin coatings and the production of such coatings on irregularly-shaped articles. Another objective is the provision of foaming compositions. These and other objectives will appear hereinafter.

A very attractive and feasible method of coating articles has been found in fluidized beds. As is known, substances used as coating materials, such as thermoplastic and thermosetting resins, may be pulverized and then fluidized by an ascending gas stream to form what is known as a fluidized bed. Using proper conditions, heated articles such as tools and racks, may be placed in the bed and coated with smooth, continuous coverings by fusion of the pulverulent material thereon, as disclosed in British Patent 759,214.

A fluidized bed has been defined as a mass of solid particles which exhibits the liquid-like characteristics of mobility, hydrostatic pressure, and an observable upper free surface or boundary zone across which a marked change in concentration of particles occurs. A fluidized bed differs from a dispersed suspension in that in the suspension an upper level or interface is not formed under conditions of continuous solids entrainment and uniform superficial velocity. In general, a dispersed suspension is analogous to a vapor, whereas a fluidized bed is analogous to a liquid. In a vessel containing a fluidized bed a dilute suspension of entrained particles above the bed also is such a dispersed suspension, and is referred to as the disperse phase, while the bed itself is referred to as the dense phase.

The objectives of this invention are accomplished by exposing a heated substrate to a pulverized material held in a fluidized state in the presence of a foaming agent or under foaming conditions. Foaming may be effected in several ways. Preferably, for example, a blowing agent may be admixed with or incorporated into the fluidized bed so that it is an intimate part of the fluidized material to be foamed. The blowing agent may be one of many commercially available chemicals that decompose upon heating to liberate gaseous substances. Or, if desired, it may simply be a volatile substance adsorbed on or absorbed in the small particles of the material to be foamed. Alternatively, or in combination with these methods, vacuum may be used or temperatures considerably in excess of those needed to make unfoamed coatings can be used. The process, thus, comprises heating an article to a temperature at least equal to the temperature required to soften or melt the material that is to make up the foam. After melt formation foaming is effected by driving or removing gaseous material from the substrate surfaces, forcing it into the melt and setting or solidifying the melted material while it contains voids or bubbles or, in other words, is a two-phase system. The gaseous material is nascently produced within the melted or softened mass and is quickly or simultaneously fixed therein. The production of the gaseous material within the melt may take place simultaneously with the melt formation or, in order to allow greater foam thickness, sometime after the initial melting occurs. The various techniques can be varied or combined, and, as a result, articles having very irregular shapes can be simply processed to produce adherent continuous foams on the surfaces exposed.

By this invention a direct, one-step foaming process is made available which avoids the difficulties of previous methods and which affords attractive economies. The process is a dry process, the materials used being substantially dry, solid particles. When foaming agents are used the foaming compositions comprise the polymeric material, with or without fillers, and the foaming agent, both being in pulverulent form, the size varying from about 20 microns to about 700 microns. While these powders may contain liquids, they are not wet materials. The disadvantages of wet processes are avoided. The extent of foaming may be carefully controlled and will depend upon the rate of flow of materials to the substrate, the temperatures used, the exposure time and the particle size, among other factors. These factors can be readily controlled to get the desired degree of foaming and to build up the foam within precise limits. The products are useful in the electrical and construction fields, as, for example, in electrical or thermal or acoustical insulation.

This invention will be further understood by reference to the description below and the figure which is a diagrammatic view of one way of making a foam on a continuous article, the dip tank being shown in cross-section.

Shown in the figure is a cross-sectional view of a vessel which may be used in working with fluidized beds. There is shown a container 1 which may be constructed of a convenient structural material such as steel, for instance, and which has an open top as indicated at 2. The container 1 is divided into an upper chamber 3 in which the pulverulent material is confined and a pressure chamber 4 by a gas pervious partition 5. This partition, which should be pervious to the gas used for fluidizing but impervious to the particles of coating material, may preferably take the form of a porous ceramic plate, although other similar structures may be advantageously used. A porous plate structure which is preferred is composed of an alundum refractory material composed of fused alumina grains bonded together with an aluminous glass at a high firing temperature. Whether composed of this or other materials, the porous plate preferably has a gas permeability which may be defined as that which will permit the passage of from one to fifteen cubic feet of air at 70° F. and 25 percent relative humidity through an area of one square foot and a plate thickness of one inch at a pressure differential equivalent to two inches of water in a period of one minute. The average pore diameter of the porous plate should preferably be in a range from 0.003 to 0.004 of an inch or less.

As shown, the container 1 is provided with a gas inlet opening 6 which is adapted for connection through a shut-off valve 7 to a suitable source of gas under pressure in order to pressurize the pressure chamber 4. The source of gas under pressure is not shown since it may consist of any conventional source such as a steel bottle of precompressed gas or, if air is to be used, a conventional air compressor and accumulation tank may be used. When air is to be used, it is also possible to attach an air blower or pump directly to the inlet connection 6. Generally, the entire assembly is positioned on supports 8.

In one form of the process of this invention, a recticulate or web material 9 in the form of a roll is unwound and passed through heater 10, either in separate stages or as shown. The roll of web material may be contained in the oven and unwound hot and passed directly to the dip tank 11. The distance between the oven and the dip tank is kept as short as possible to minimize heat loss. If desired, auxiliary heaters may be used between the oven and the dip tank, but normally these are not needed. Positioned at the open top is a heated metal shoe or mandrel 12 which may be raised or lowered by any convenient means at 16. The web 9 enters and leaves the tank as shown, and while in the bed, it contacts the convex surface 14 of mandrel 12. This surface is uniformly heated under the conditions in use, generally by electricity, so that web 9 is uniformly heated as it passes through the tank. The far side of the web directed toward the bottom of the tank 11 is contacted by the solid particles which usually include a blowing agent and by the gas in the fluidized bed 15 as they travel upwards. The solid particles are made to penetrate into the interstices of the web, are heated and melted. Upon softening or melting they adhere to surface portions of the web. At the same time or while the mass is a melt, the blowing agent decomposes, liberating a gas. The openings between membranes of the web are filled with foam to an extent dependent upon such factors as temperature and exposure time, and an article bearing a foam emerges from the tank.

This, of course, is only one of many articles upon which foam may be built. This invention may be further understood by reference to the following examples which are given for illustrative purposes and are not limitative.

*Example I*

Copper tubing in various lengths was heated to 710° F. and placed in a fluidized bed of a pulverized commercially available polyethylene containing a blowing agent such as diazoaminobenzene. The tubing was immersed from about 4 to about 6 seconds exposing the outside surfaces only. The solid, pulverulent particles coming into contact with the heated copper surfaces melted and the blowing agent decomposed, liberating gaseous materials, such as nitrogen. These materials in being driven away from the hot copper surfaces disrupted the melt forming a mass filled with bubbles or voids.

In another experiment threaded 6 inch lengths of copper pipe and of brass pipe were similary treated to produce foams on the surfaces thereof while protecting the threads and the inside surfaces. Different times and temperatures were used and on some lengths repeated immersion was effected, while on others the foam formed was post-heated. By varying such factors it was possible to produce foams varying in thickness from about $\frac{1}{100}$ inch upwards, the maximum effective immersion time being about 50 seconds. In a number of instances a foaming agent having a delayed foaming action is used or the polymer melt is formed at temperatures below the activation temperature of the foaming agent. After a melt of the desired thickness is formed, the temperature is raised or the foaming is otherwise started and thick foams result.

To test the effectiveness of foams such as produced above for thermal insulation, tubing containing thereon foam layers produced in accordance with this invention were tested in systems involving 200 lbs. brine pressure and —15° F. or less. Complete prevention of accumulation of frost was achieved. On those sections bearing the foam no frost appeared, whereas on adjacent sections or if the foam layer was not present, a very heavy layer of frost and ice formed.

*Example II*

A silicone resin produced and sold by the Dow-Corning Corporation as R-7001 and containing a foaming agent, was pulverized. The maximum particle size was about 210 microns. A steel rod, having a ½ inch diameter and a length of 2½ inches, was heated for 30 minutes at 350° F. The pulverulent silicone resin was fluidized, and the heated rod was dipped into the dense phase of the fluidized bed and held there for about 2 seconds. Upon removal, the resultant article was heated for 20 minutes in an oven at 350° F. The layer on the rod was a foam about 30 mils in thickness, and it adhered strongly to the steel rod.

*Example III*

A vinyl resin consisting of 100 parts of polyvinyl chloride, 50 parts plasticizer, 5 parts stabilizer and 6 parts color pigment was prepared by intensive blending of all components on a 2-roll mill. The resultant compound was then chilled with liquid nitrogen and pulverized in a hammer mill, yielding a maximum particle size of 210 microns. This powder was then dry blended with one part of azodicarbonamide per 100 parts of powder. The resultant mixture was used to produce a foam on a steel rod that had a ½ inch diameter and was 2½ inches long.

The rod was heated in a convection oven at 500° F. for 40 minutes. Upon removal thereof it was immediately dipped in the fluidized polyvinyl chloride polymer and held in the bed for about 5 seconds. A post heating treatment was applied, this being heated at 500° F. for 30 seconds.

The adherent foamed coating or layering on the rods was about 25 mils in thickness.

*Example IV*

The plasticized polyvinyl chloride resin used in Example III was fluidized and rods similar to those used in that example were processed as follows: After heating at 500° F. for 40 minutes, the rod was dipped in the dense phase of the fluidized bed for about 5 seconds. The resultant article was then heated at 50° F. for about 30 seconds and immersed in the bed a second time, this being again about 5 seconds. The article was then heated in a convection oven a second time being 30 seconds at 500° F.

As a result of this double dip technique, the strongly adhering foamed coating or layering was about 75 mils in thickness.

In another experiment, irregularly shaped brackets were treated as above but the post-heating the second time was carried out under partial vacuum. By so doing the foam thickness was almost doubled.

Example V

This example illustrates foam formation in the absence of a chemical blowing agent. Sandblasted aluminum rods 2½ inches long and ½ inch diameter were heated to about 600° F. and immersed for about 4 seconds in a fluidized bed of polyethylene. After a melt of polymer had formed on the surfaces of the rods and while the coating was still in melt form, the rods were placed in a vessel and a partial vacuum was applied. The articles were allowed to cool in the vacuum. The resulant polymeric layer was a mass filled with small bubbles. Gaseous material was driven away from the metal surfaces into the polymer mass where they were trapped by the cooling mass.

Similar results are attained using plasticized cellulosic materilas, such as cellulose ethers or esters. The vacuum is applied so as to avoid pulling the mass from the substrate and to avoid blistering. Cooling can be accomplished by using water fog while partial vacuum still exists.

Example VI

This example illustrates the use of volatile liquids in foam formation. Rods and flat sheets of steel were heated from about 180° F. to about 250° F. and immersed in a fluidized bed of a commercially available phenol-formaldehyde resin which had been pulverized to about −50 mesh size. While this resin did contain some volatile liquid therein, namely water, it, under the application conditions, gave off water as a reaction product resulting presumably from polymerization-depolymerization reactions. The steel articles were immersed from about 2 to about 5 seconds and the polymer very readily formed a foam thereon of about 20 thousandths of an inch in thickness. By post-heating for about 15 minutes at 350° F., this foam was increased in the amount of the dispersed or bubble phase. Thicker foams can be prepared by increasing the amount of polymer build-up followed by gas liberation, post-heating, if required, to get optimum foaming.

Example VII

In this example, heating the substrate to an excessively high temperature was the means used to effect foaming. Aluminum foil was passed continuously to a heated mandrel similar to that shown in the drawing, the foil being heated previously and by the mandrel to about 1,100° F. This temperature was considerably in excess of the temperatures used for making unfoamed coatings of polyvinyl chloride, the material used in this experiment. As the foil passed through the fluidized bed of plasticized polyvinyl chloride, the polymer melted and the mass uniformly was disrupted by the formation of bubbles and voids therein. Immersion time was about 3 seconds. Cooling of the mass was timely effected to trap the bubbles and produce a foam. The resultant relatively thin, continuous foamed coating had a thickness of 0.010 inch. It was stripped from the foil and was useable as such, layering it on itself if desired or cutting it into tape for wrapping on articles to be insulated such as cold or hot water pipes.

Example VIII

To a cylindrical, steel mandrel having an outside diameter of about 3 inches and heated to a temperature of about 750° F. was passed a continuous web material, a fiberglass cloth. The mandrel was positioned in the dip tank as shown in the figure and the fluidized polymer was a pulverized commercially available polyethylene containing a blowing agent. The polyethylene had a molecular weight of about 10,000 and was predominately 40 mesh in particle size. The immersion time was 4 to 6 seconds. Upon removal the continuous article was found to have foam within the interstices of the web as well as on the surfaces of the fibers and above the interstices.

Similar results are attained using heavy paper of various kinds, such as Manila paper. In using a continuous metal sheeting of small thickness, it is sometimes desirable to preheat it in the oven. While this is not necessary, by so doing one does not have to rely on the mandrel for the sole source of heat. Thin metal foils lose heat rapidly, and use of the oven is both economic and much better results are attained on a uniform basis. While foams may be stripped from substrates, such as thin foils, stripping is facilitated by coating the substrate with a material having little adhesive attraction for the foam.

The articles upon which foams may be built are numerous and include sheets, rods, tubing, pipes, plumbing articles of all kinds such as elbows, nipples, and goosenecks, heavy paper, textiles, metals, wood, hardboards, plasterboards, glass and the like. The foams produced may be made to adhere to and be used with the parent article, or they may be stripped from the substrate for separate use. The foams of this invention may be used in the many known applications of foams including carpet underlayments, industrial and upholstery applications, clothing, dolls and other toys for children, draperies, heat and cold insulation and as electrical insulation, for example, on wires or other conductors. Outlets also include automotive applications, sound insulation, floor coverings and shock protection. Still another use is as seals for containers, as for example, in bottle caps, the pressure exerted on the foam cushion forming a tight seal about the pressing edges of the container.

The foams of this invention can be made to be quite rigid, for closed foams are readily produced. Isolated bubbles may be randomly trapped throughout a mass preventing or slowing down the exhausting of the gas or air, for example. This is advantageous in many of the above applications. Another advantage of this invention lies in the production of relatively thin continuous foamed coatings. It is difficult to produce such foams by conventional methods, but this invention affords an easy way to make continuous foamed coatings as thin as 0.005 inch. Foams having thicknesses of 0.010 inch to 0.015 inch can be produced in a continuous, controlled productive manner. As seen above, thicker foams are also produced.

The materials from which foams may be produced include polyvinyl halide resins such as plasticized polyvinyl chloride. Also included are polystyrene, polyethylenes, plasticized cellulose ethers and esters, the phenolics, polyamides such as polymerized-epsilon-caprolactam, epoxy resins, melamines, polyurethanes, urea resins, acetal resins, polyvinyl acetate, silicone resins and naturally occurring materials such as shellac. In making foams of urethanes, the reactive components thereof, such as a polyester and a diisocyanate, will be used in a pulverized form, the gas being liberated on polyurethane formation being carbon dioxide. With the phenolics, polymers are previously formed but water of reaction may be used as the blowing agent. Combinations or mixtures of these may also be foamed by the processes of this invention, the polymers having, of course, molecular weights or polymeric natures that make them coating materials.

In those instances where a blowing agent is used that agent may be selected from any of the several available commercially. For example, the agent may be N,N'-dinitrosopentamethylene tetramine, diazoaminobenzene, azo-dicarbonamide, 2,2'-azo-isobutyronitrile, azo-hexahydrobenzonitrile, benzene sulfonylhydrazide, p,p'-oxybis-benzene sulfonylhydrazide, p - tertiary-butylbenzoyl azide or a mixture of urea and biuret. Inorganic materials, such as ammonium bicarbonate, sodium bicarbonate and sodium nitrate may also be used as blowing agents. Mixtures may be employed These agents may be in the form of finely divided solids and readily mixed with the main foam ingredient. Liquid forms may be used, the liquids being absorbed by the fluidized polymer particles and/or by any fluidized filler particles used therewith. Such fillers include carbon black, graphite, molybdenum sulfide, titanium dioxide and zinc oxide. The resultant mixtures to be used in foaming are finely divided, dry or substantially dry solids.

Such agents may also be used in those instances where vacuum is applied, or where gaseous substances are liberated during the application of the material to the substrate or where very high temperatures are used. Similarly, volatile liquids can be used. Hydrophilic polymers may be soaked in or subjected to water vapor prior to fluidization. Hydrophobic polymers may be made to absorb or adsorb low boiling liquids such as acetone and the alcohols. Such liquids may act as plasticizers for the pulverulent particles but even though the particles may be slightly wet with plasticizers they are kept sufficiently dry so that ready fluidization can be obtained. In general, no more than about 10% of the liquid is used, a workable range being about 1% to about 8% by weight. When water is the volatile blowing agent about 5% by weight of the foaming composition is water, the remainder being polymeric or filler material. It is also possible to pulverize the particles so that substantial quantites of air are adsorbed on the particle surfaces. Thus, air acts as a blowing agent.

This invention obviates the need for expensive extruders, molds, pressure equipment and the like hithertofore needed to foam such resins as polyethylene, polystyrene and vinyls. The processes involved are simple; the materials used are stable. Foaming takes place in situs, and solid or reticulate articles of any size or shape may be used as substrates. Further, foams are produced from solids. Thickness and rigidity may be carefully controlled. The resultant foams may be used with the article on which they are formed or they may be readily removed therefrom and used separately.

Still further, foams of widely differing characteristics are attained, these being rigid, flexible and semi-flexible as desired and having various densities.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

I claim:
1. A process for forming a foam on a substrate which comprises fluidizing the material to be foamed in a dry pulverulent form in a vessel; placing said substrate in said vessel to be contacted by said material while said substrate is heated to a temperature at least as high as the softening temperature of said material; allowing said fluidized material to flow against the heated substrate, thereby forming a softened mass of said material thereon; producing gaseous material within the resultant melt; and setting the melt with said gaseous material therein, thereby forming said foam.

2. A process in accordance with claim 1 in which said gaseous material is produced by using a chemical blowing agent.

3. A process in accordance with claim 1 in which said gaseous material is produced within said melt by using a vacuum.

4. A process in accordance with claim 1 which includes heating the resultant foam after it is removed from said vessel.

5. A process in accordance with claim 1 in which said article is given a plurality of contacts by said fluidized material.

6. A process in accordance with claim 1 in which said article is smooth surfaced.

7. A process in accordance with claim 1 in which said article is reticulate.

8. A process in accordance with claim 1 in which the substrate is heated to a temperature exceeding that required to make an unfoamed coating.

9. A process for forming a foam on a substrate which comprises fluidizing the material to be foamed in a vessel and in the presence of a substance capable of liberating a gas upon being heated; heating the said substrate to a temperature at least high enough to soften said material and to liberate said gas; placing said heated substrate in said vessel to be contacted by the fluidized material, thereby by resultant heat transfer causing softening of said material and evolution of said gas; and setting the softened mass while it contains gaseous material therein, thereby forming said foam.

10. A process in accordance with claim 9 in which said material is an organic polymer.

11. A process in accordance with claim 9 in which said material is an organic polymer and said substance is a chemical blowing agent.

12. A process in accordance with claim 9 in which said foam is a rigid foam.

13. A process for forming a foam on a substrate which comprises blending a coating material and a blowing agent and pulverizing to produce a pulverulent foaming blend; fluidizing this blend in a vessel; placing said substrate in said vessel to be contacted by said blend while said substrate is heated at a temperature at least as high as the softening temperature of said blend; allowing said fluidized blend to flow against the heated substrate, thereby forming a softened mass thereon; producing gaseous material within the resultant melt; and setting the melt with the said gaseous material therein, thereby forming said foam.

14. A process for forming a foam on a substrate which comprises pulverizing the material to be foamed and causing said material to absorb from 1% to 10% by weight of a liquid, based on the weight of the material, fluidizing the material to be foamed in a vessel, the material being sufficiently dry to be fluidized; placing said substrate to be contacted by said material in said vessel while said substrate is heated to a temperature at least as high as the softening temperature of said material; allowing said fluidized material to flow against the heated substrate, thereby forming a softened mass of said material thereon; said liquid being volatile at said temperature to which said substrate is heated thereby producing gaseous material within the resultant melt; and setting the melt with said gaseous material therein, thereby forming said foam.

References Cited in the file of this patent

UNITED STATES PATENTS

| | | |
|---|---|---|
| 2,844,489 | Gemmer | July 22, 1958 |
| 2,861,046 | Stastny | Nov. 18, 1958 |
| 2,862,834 | Hiler | Dec. 2, 1958 |
| 2,864,777 | Greenhoe | Dec. 16, 1958 |

FOREIGN PATENTS

| | | |
|---|---|---|
| 684,708 | Great Britain | Dec. 24, 1952 |
| 759,214 | Great Britain | Oct. 17, 1956 |

UNITED STATES PATENT OFFICE
CERTIFICATE OF CORRECTION

Patent No. 2,981,631            April 25, 1961

Fritz J. Nagel

It is hereby certified that error appears in the above numbered patent requiring correction and that the said Letters Patent should read as corrected below.

Column 4, line 67, for "50° F." read -- 500° F. --.

Signed and sealed this 19th day of September 1961.

(SEAL)
Attest:

ERNEST W. SWIDER
Attesting Officer

DAVID L. LADD
Commissioner of Patents

USCOMM-DC